(12) United States Patent
Lunceford et al.

(10) Patent No.: US 11,580,554 B2
(45) Date of Patent: Feb. 14, 2023

(54) MULTI-LAYERED CREDIT CARD WITH TRANSACTION-DEPENDENT SOURCE SELECTION

(71) Applicant: LendingClub Corporation, San Francisco, CA (US)

(72) Inventors: Shane Lunceford, San Jose, CA (US); Alejandra Tonda, Walnut Creek, CA (US); Janna Goldberg, Oakland, CA (US); Albert Lee, San Francisco, CA (US); Michael Homnick, San Francisco, CA (US)

(73) Assignee: LENDINGCLUB BANK, NATIONAL ASSOCIATION, Lehi, UT (US)

( * ) Notice: Subject to any disclaimer, the term of this patent is extended or adjusted under 35 U.S.C. 154(b) by 138 days.

(21) Appl. No.: 16/729,245

(22) Filed: Dec. 27, 2019

(65) Prior Publication Data
US 2021/0201316 A1   Jul. 1, 2021

(51) Int. Cl.
*G06Q 20/40* (2012.01)
*G06Q 20/34* (2012.01)
(Continued)

(52) U.S. Cl.
CPC ........... *G06Q 20/405* (2013.01); *G06N 20/00* (2019.01); *G06Q 20/047* (2020.05);
(Continued)

(58) Field of Classification Search
CPC .. G06Q 20/405; G06Q 20/047; G06Q 20/227; G06Q 20/3572; G06Q 20/401; G06Q 20/20; G06N 20/00
See application file for complete search history.

(56) References Cited

U.S. PATENT DOCUMENTS 8,560,447 B1 * 10/2013 Hinghole ............... G06Q 20/14
  705/40
9,092,767 B1 * 7/2015 Andrews .............. G06Q 20/227
(Continued)

FOREIGN PATENT DOCUMENTS

WO   WO-2010083454 A2 * 7/2010 ........... G06Q 20/102
WO   WO-2020124037 A1 * 6/2020 ......... G06F 16/2365

OTHER PUBLICATIONS

Leskovec, Jure, Anand Rajaraman, and Jeffrey David Ullman. "Mining of Massive Datasets." (Jul. 2019) (Year: 2019).*
(Continued)

*Primary Examiner* — Bennett M Sigmond
*Assistant Examiner* — James H Miller
(74) *Attorney, Agent, or Firm* — Hickman Becker Bingham Ledesma LLP

(57) ABSTRACT

Techniques are described herein for selecting an optimal financial account for a financial transaction. In an embodiment, a multi-account payment card is used to initiate a financial transaction. Transaction information of the financial transaction including a multi-account payment card ID is transmitted to a server for processing. The server determines that the multi-account payment card ID is associated with a plurality of financial accounts, wherein each of the plurality of financial accounts is associated with any one of a credit card, a debit card, an automatic teller machine (ATM) card, a gift card, or a credit line. A financial account of the plurality of financial accounts is selected by the server based on financial account information, such as reward information, associated with the plurality of financial accounts and the transaction information of the financial transaction. The financial transaction is then charged to the selected financial account.

26 Claims, 3 Drawing Sheets

(51) Int. Cl.
G06N 20/00 (2019.01)
G06Q 20/22 (2012.01)
G06Q 20/04 (2012.01)

(52) U.S. Cl.
CPC ....... *G06Q 20/227* (2013.01); *G06Q 20/3572* (2013.01); *G06Q 20/401* (2013.01)

(56) References Cited

U.S. PATENT DOCUMENTS

| | | | | |
|---|---|---|---|---|
| 9,836,739 | B1* | 12/2017 | Borovsky | G06Q 20/20 |
| 10,692,058 | B2* | 6/2020 | Zoldi | G06Q 20/10 |
| 10,692,059 | B1* | 6/2020 | Thome | G06Q 20/36 |
| 2008/0301041 | A1* | 12/2008 | Bruk | G06Q 20/227 |
| | | | | 705/39 |
| 2009/0043702 | A1* | 2/2009 | Bennett | G06Q 20/3572 |
| | | | | 705/41 |
| 2009/0144194 | A1* | 6/2009 | Dickelman | G06Q 20/10 |
| | | | | 705/35 |
| 2010/0017325 | A1* | 1/2010 | Scherpa | G06Q 20/10 |
| | | | | 705/35 |
| 2012/0253852 | A1* | 10/2012 | Pourfallah | G06Q 20/405 |
| | | | | 705/4 |
| 2013/0036036 | A1* | 2/2013 | Zoldi | G06Q 30/0269 |
| | | | | 705/35 |
| 2013/0200999 | A1* | 8/2013 | Spodak | G16H 10/60 |
| | | | | 340/5.65 |
| 2014/0136353 | A1* | 5/2014 | Goldman | G06Q 20/227 |
| | | | | 705/16 |
| 2015/0112822 | A1* | 4/2015 | Aaron | G06Q 20/3572 |
| | | | | 705/17 |
| 2016/0335653 | A1* | 11/2016 | Bodington | G06Q 30/0227 |
| 2017/0076291 | A1* | 3/2017 | Cairns | G06Q 20/38215 |
| 2017/0206466 | A1* | 7/2017 | Zoldi | G06F 3/0485 |
| 2017/0243198 | A1* | 8/2017 | Lee | G06K 19/07 |
| 2017/0308952 | A1* | 10/2017 | Zoldi | G06Q 40/00 |
| 2018/0096261 | A1* | 4/2018 | Chu | G06N 20/20 |
| 2018/0096319 | A1* | 4/2018 | Aggarwal | G06Q 20/403 |
| 2018/0300705 | A1* | 10/2018 | Link | G06Q 20/24 |
| 2020/0074449 | A1* | 3/2020 | Novis | G06N 3/0454 |
| 2020/0167786 | A1* | 5/2020 | Kursun | H04L 63/08 |
| 2020/0202330 | A1* | 6/2020 | Novis | G06N 3/0454 |
| 2021/0004896 | A1* | 1/2021 | Gannon | G06Q 20/0855 |
| 2021/0027302 | A1* | 1/2021 | Resheff | G06N 20/20 |
| 2021/0027357 | A1* | 1/2021 | Bonfigli | G06Q 30/0621 |
| 2021/0081920 | A1* | 3/2021 | Spina | G06N 20/00 |

OTHER PUBLICATIONS

Y. Lecun, L. Bottou, Y. Bengio and P. Haffner, "Gradient-based learning applied to document recognition," in Proceedings of the IEEE, vol. 86, No. 11, pp. 2278-2324, Nov. 1998, doi: 10.1109/5.726791. (Year: 1998).*

Fu K., Cheng D., Tu Y., Zhang L. (2016) Credit Card Fraud Detection Using Convolutional Neural Networks. In: Hirose A., Ozawa S., Doya K., Ikeda K., Lee M., Liu D. (eds) Neural Information Processing. ICONIP 2016. Lecture Notes in Computer Science, vol. 9949. Springer, Cham. (Year: 2016).*

Federated Optimization for Financial Transaction Management (Year: 2019).*

* cited by examiner

MULTI-LAYERED CREDIT CARD WITH TRANSACTION-DEPENDENT SOURCE SELECTION

FIELD OF THE INVENTION

The technical field to which the present disclosure generally relates is computer software in the field financial transaction processing. The technical field also includes machine learning algorithms.

BACKGROUND

A consumer may use many types of payment cards such as credit cards, debit cards, and gift cards to make purchases. Each card may be associated with financial accounts that have different transaction-based rewards and/or different interest rates. For example, a user may have the following four credit cards:

|  | Card1 | Card2 | Card3 | Card4 |
| --- | --- | --- | --- | --- |
| Credit rate | 15% | 15% | 10% | 18% |
| Travel-related points-per-dollar | 3 | 0 | 0 | 0 |
| Dining-related points-per-dollar | 0 | 2 | 0 | 0 |
| If $1000 is spent in first month | 0 | 0 | 0 | 60,000 points |

Consumers may find carrying and using multiple payment cards inconvenient and burdensome. Additionally, consumers may experience difficulty identifying which card is the best card to use for each transaction to optimize their credit card rewards and interest rates. For example, among the four cards illustrated above, the best choice may be to use Card4 until $1,000 is spent, and then to use Card1 for travel-related expenses, Card2 for dining-related expenses, and Card3 for everything else.

It is unlikely that a user is going to remember the benefit details of each card. Therefore, it is unlikely that a user will make the optimal choice for each transaction. For example, a user may remember that Card3 has the lowest interest rate, and therefore use Card3 for all purchases. Alternatively, the user may remember that it is important to use Card4 to get the introductory bonus points. Under these circumstances, the user may continue to use Card4 long after the $1000 spend requirement has been satisfied, thereby losing the benefits of the other cards. Thus, techniques are desired to automatically select, on a per-financial-transaction basis, an optimal payment card out of a set of payment cards.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
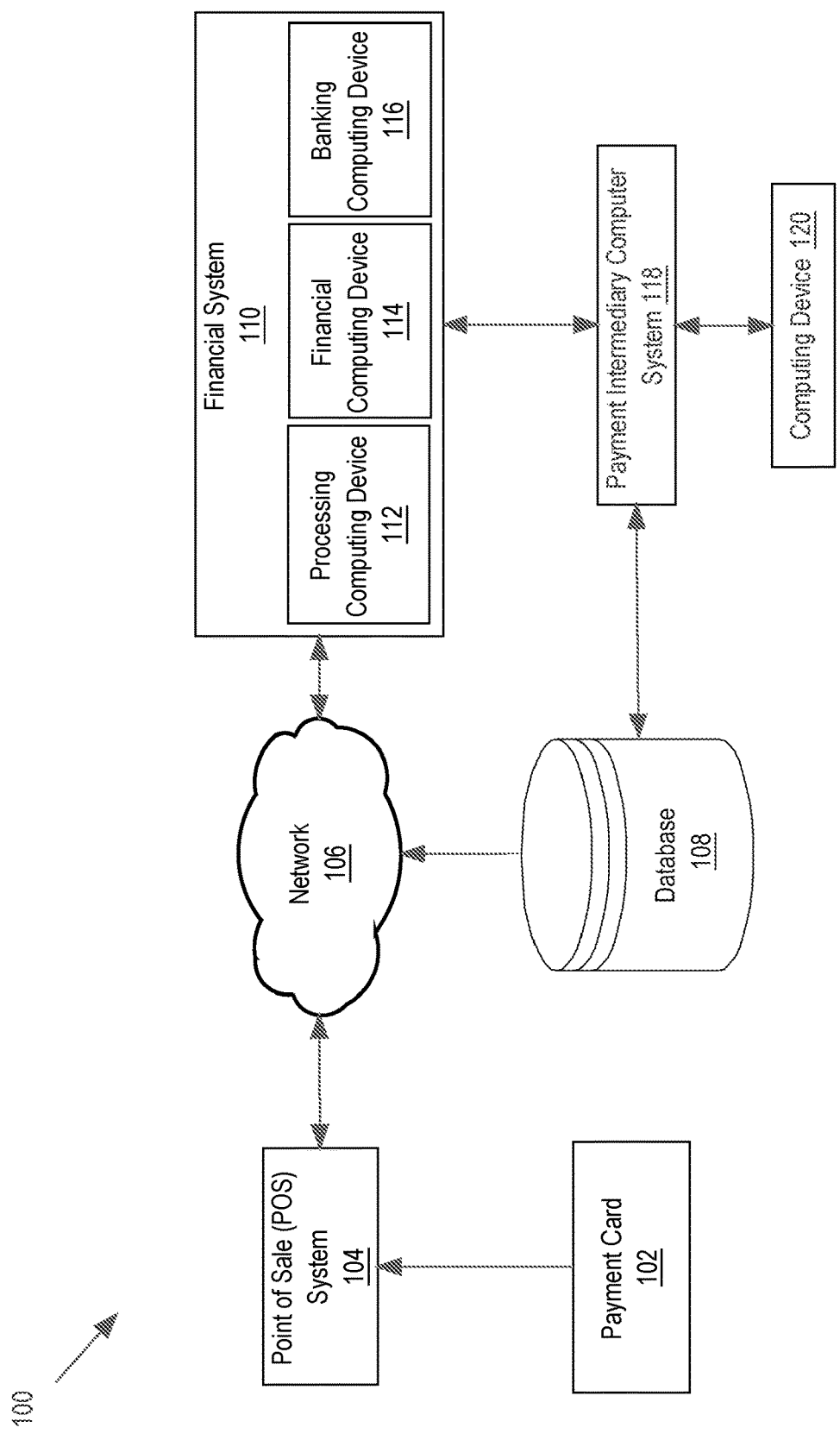
FIG. 1 is a block diagram illustrating a system for transaction-dependent financial account selection, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Techniques are described herein for linking a "multi-account payment card" of a consumer with multiple financial accounts of the consumer. The accounts to which the multi-account payment card is linked may include, for example, credit card accounts, automated teller machine (ATM) debit card accounts, gift card accounts, credit line accounts, and/or investment accounts. A multi-account payment card can be, for example, a magnetic stripe card physically similar to a traditional credit card, a smartcard (i.e., a card with embedded IC chip), a card with a bar code, or a card with a QR code. Each financial account may be associated with different rewards and interest rates.

A consumer can engage in a financial transaction with a merchant using the multi-account payment card. A financial transaction referred to herein can be, for example, point-of-sale (POS) transaction where the consumer makes a purchase at a store front, or other "brick-and-mortar" location, or simply in the presence of a merchant, or an electronic transaction conducted over the Internet (e.g., enter card number of the multi-account payment card using a web site).

A consumer can use the multi-account payment card to make a payment of a financial transaction in which funds for the payment come from one of the linked financial accounts. Based on (a) financial account information associated with each of the financial accounts and (b) transaction information associated with the financial transaction, a transaction-dependent financial account selection system ("TDFAS system") automatically selects a financial account from one of the linked financial accounts in an optimum manner (e.g. to maximize reward points and/or minimize interest payments).

For example, reward information for a first financial account may specify that the first financial account offers 3 points per dollar on travel purchases, 3 points per dollar on dining purchases, 1 point per dollar everything else, and no foreign transaction fees. A second financial account may specify that the second financial account offers 5 points per dollar on travel purchases and 1 point per dollar everything else. If transaction information is received for a financial transaction that indicates a travel related purchase, the second financial account that maximizes points for travel purchases may be selected. Similarly, if transaction information is received for a financial transaction that indicates a dining related purchase, the first financial account that maximizes points for dining purchase may be selected.

Feedback information for a financial account selection can be provided by a consumer after a financial account is selected for a financial transaction. Such feedback information can be used to tune machine learning models that may be used in combination with other selection techniques to provide an optimal selection of a financial account for a given financial transaction.

Financial Account Information

As mentioned above, financial account information may be one factor used by a TDFAS system when selecting among a plurality of financial accounts that could be used to fund a given transaction. Financial account information may include any information relating to a financial account. Financial account information may include, for example, a balance of a financial account; a credit limit of the financial account; reward information associated with the financial account; account holder information on file with a financial institution including names, emails, phone numbers, and addresses; income information associated with the financial account; liability information including any recurring payments associated with the financial account, any loans associated with the financial account, an amount owed for any existing loan, loan terms for any existing loans, and original loan amount; and one or more financial transactions associated with the financial account that each include: a date, a merchant name or transaction description, location, category, and amount.

Transaction Information

Instead of or in addition to financial account information, a TDFAS system may selecting the financial account to use to fund a given transaction based on information about the transaction itself. The term "transaction information", as used herein, refers to any information about the specific transaction for which the TDFAS system is selectin a financial account. For example, the transaction information may indicate that a transaction occurred at McDonalds in Madrid, Spain. The TDFAS system may utilize a third-party service to determine that McDonalds is included in a 'dining' category or may use internal programmable logic to determine that McDonalds is included in a 'dining' category. Likewise, a TDFAS system may use internal programmable logic to determine that 'Madrid, Spain' is a different country than an address associated with the multi-account payment card that is being used in the transaction. Consequently, the TDFAS system may identify that the category 'Foreign Spending' is applicable to the transaction.

TDFAS System Overview

FIG. 1 is a block diagram that illustrates a TDFAS system, according an embodiment. Referring to the embodiment illustrated in FIG. 1, financial System 110 includes processing computing device 112, financial computing device 114, and banking computing device 116. Each of processing computing device 112, financial computing device 114, and banking computing device 116 may comprise one or more server computers or other computing devices that execute programmatic instructions to facilitate financial account selection operations, as further discussed herein.

Financial system 110 includes payment intermediary computer system 118. In one embodiment, payment intermediary computer system 118 is under the control of banking computing device 116. In another embodiment, payment intermediary computer system 118 is under the control of financial computing device 114. In another embodiment, payment intermediary computer system 118 is under the control of processing computing device 112.

In TDFAS system 100, a transaction is initiated when a multi-account payment card 102 is used at the point of sale (POS) system 104. Multi-account payment card 102 may comprise a magnetic stripe card or digital chip card similar to a credit card. In some embodiments, multi-account payment card 102 may be swiped through a card reader that is coupled to POS System 104. The card reader may send the information obtained from multi-account payment card 102 (the "multi-account payment card information") to POS system 104. POS system 104 then transmits the multi-account payment card information to financial System 110 via network 106. POS system 104 may also transmit transaction information. Transaction information may include any information obtained from the POS 104, such as a designation of goods or services being purchased in a transaction (e.g. "carrots") or a category of goods or services being purchased in a transaction (e.g. "groceries").

The multi-account payment card information and transaction information may be received by processing computing device 112. An example of processing computing device 112 is Wells Fargo Merchant Services. Processing computing device 112, based on the received multi-account payment card information, may relay the multi-account payment card information to the appropriate financial computing device 114. For example, if multi-account payment card 102 is encoded as a VISA branded multi-account payment card, processing computing device 112 relays the received information to the financial computing device 114 that processes VISA branded multi-account payment cards. In this example, financial computing device 114 may be VISA's VisaNet Payment system, which processes payments made using VISA branded multi-account payment cards.

The multi-account payment card information includes meta-data which financial computing device 114 uses to transmit the multi-account payment card information to payment intermediary computer system 118, such as a device ID or IP address. Financial computing device 114 may transmit multi-account payment card information to TDFAS system 118 for further processing.

Payment intermediary computer system 118 receives multi-account payment card information and transaction information from financial System 110. Payment information may include any information obtained from a multi-account payment card that was used to initiate a transaction, such as a multi-account payment card ID. Payment intermediary computer system 118 may also query financial account information from database 108. Payment intermediary computer system 118 may obtain financial account information (a) from third party sources or obtain such information, (b) manually from a consumer using computing device 120, and/or (c) any combination thereof.

Payment intermediary computer system 118 may comprise one or more server computers or other computing devices that execute programmatic instructions to perform financial account selection operations, as further discussed herein. Once payment information and transaction information are received, payment intermediary computer system 118 determines one or more financial accounts that are associated with the multi-account payment card and selects a financial account to use for the financial transaction. Once a financial account is selected, payment intermediary computer system 118 sends the selected financial account information to financial system 110. In the embodiment of FIG. 1, this includes sending the selected financial account information to financial computing device 114.

The financial devices to which the transaction information and financial account information is sent is dictated by the financial account that is selected by the payment intermediary computer system 118. Once received, financial computing device 114 determines that the received financial account is managed by banking computing device 116 and sends the transaction and financial account information to banking computing device 116. An example of a banking computing device is server computing operated by an entity such as Wells Fargo Bank. Banking computing device 116 determines the result of payment authorization and sends the results of the authorization to POS System 104 to complete the financial transaction.

Upon completion of the transaction, payment intermediary computer system 118 generates a digital receipt, and causes the digital receipt to be delivered to computing device 120 associated with a consumer (e.g. to the consumer's mobile phone). Once a digital receipt is received, a consumer can optionally perform various actions associated with the transaction via the digital receipt. The various actions, or interactions, performed via the digital receipt may include, for example: providing feedback regarding the selection of a financial account; accepting an offer included in the digital receipt 160; and reviewing loyalty reward points awarded as a result of the transaction.

Example Procedure for Transaction-Dependent Account Selection

Figure 2:
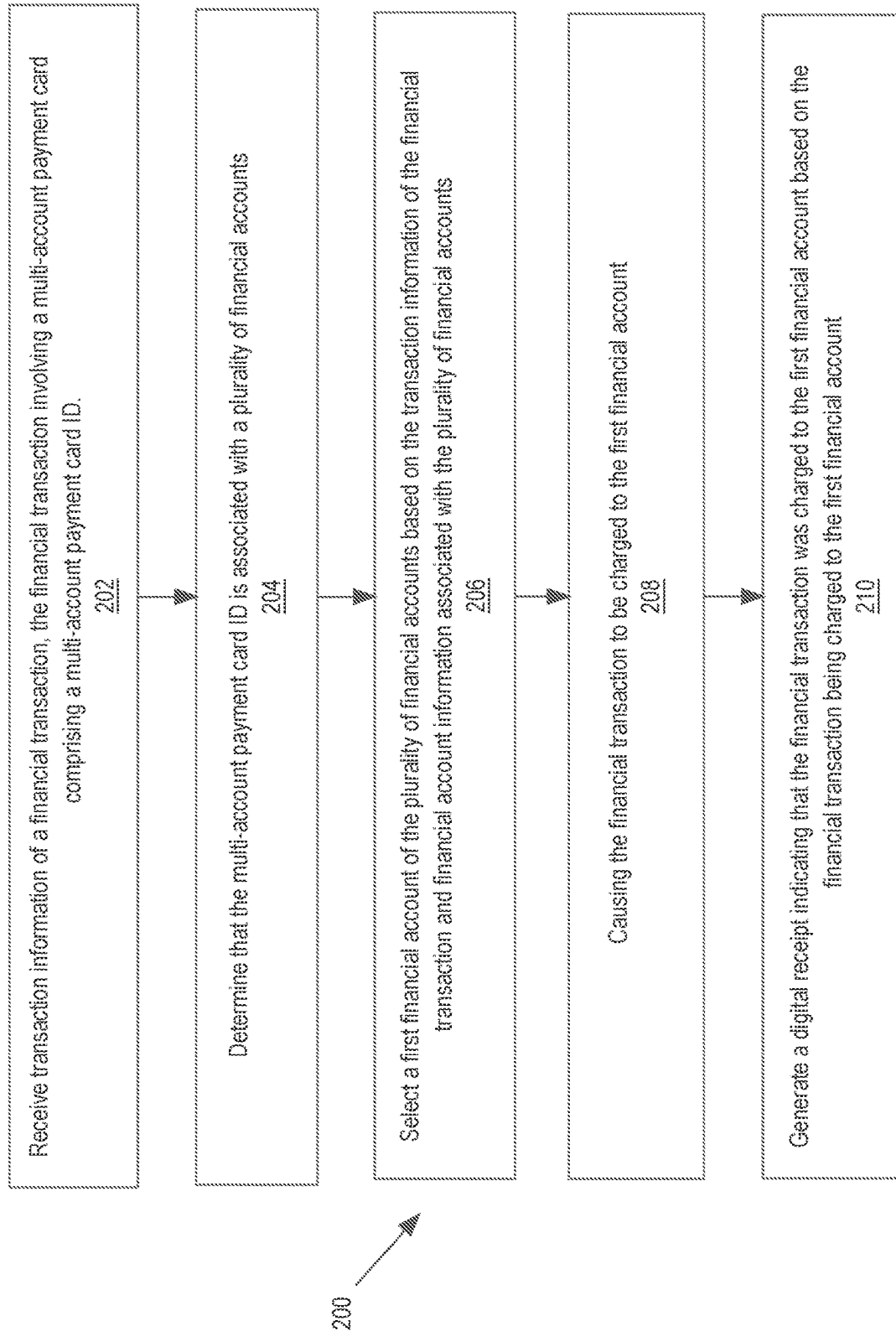
FIG. 2 is a flowchart illustrating steps for transaction-dependent financial account selection, according to an embodiment.

FIG. 2 is a flowchart illustrating how TDFAS system 100 may perform transaction-dependent financial account selection, according to an embodiment. FIG. 2 and each other flow diagram herein illustrates an algorithm or plan that may be used as a basis for programming one or more of the functional modules of FIG. 1 that relate to the functions that are illustrated in the diagram, using a programming development environment or programming language that is deemed suitable for the task. Thus, FIG. 2 and each other flow diagram herein are intended as an illustration at the functional level at which skilled persons, in the art to which this disclosure pertains, communicate with one another to describe and implement algorithms using programming. The flow diagrams are not intended to illustrate every instruction, method object or sub step that would be needed to program every aspect of a working program, but are provided at the high, functional level of illustration that is normally used at the high level of skill in this art to communicate the basis of developing working programs. For purposes of illustrating a clear example, FIG. 2 and other flow diagrams are discussed in the context of FIG. 1, but the algorithms of FIG. 2 and the other flow diagrams also can be implemented in other contexts.

In step 202, transaction information of a financial transaction is received. The financial transaction involves a multi-account payment card that is associated with a particular multi-account payment card ID. For example, multi-account payment card 102 may be swiped through a card reader that is coupled to POS system 104. The card reader may send the multi-account payment card information obtained from the multi-account payment card along with transaction information of the financial transaction to POS system 104. POS system 104 then transmits the multi-account payment card information and transaction information to financial system 110, which transmits the multi-account payment card information and transaction information to payment intermediary computer system 118.

In step 204, it is determined that the multi-account payment card ID is associated with a plurality of financial accounts. Each of the plurality of financial accounts represents a distinct source of funding, such as a credit card, a debit card, an automatic teller machine (ATM) card, a gift card, a credit line, etc. For example, payment intermediary computer system 118 may query database 108 to determine the plurality of financial accounts that are associated with the multi-account payment card ID.

In step 206, a first financial account of the plurality of financial accounts is selected to use in the financial transaction.

General Logic for Selecting which Account to Use in a Given Transaction

Payment intermediary computer system 118 can make the selection of which financial account to use in a given transaction based on various criteria. In general, the selection of a financial account can be made based on (a) the transaction information received in step 202, and (b) financial account information. As discussed above, transaction information may include any information obtained from a POS such as a designation of goods or services being purchased in a transaction or a category of goods or service being purchased in a transaction.

Financial account information for a plurality of financial accounts can be analyzed to determine one or more categories for each financial account of the plurality of financial accounts. For example, reward information for a particular financial account may specify that the financial account offers 3 points per dollar on travel purchases, 3 points per dollar on dining purchases, 1 point per dollar everything else, and no foreign transaction fees. Based on the reward information for the particular financial account, the categories of 'Travel', 'Dining', 'Everyday Spending', and 'Foreign Spending' may be associated with the particular financial account.

When transaction information is received, such as in step 202, the transaction information can be analyzed to determine one or more categories for the transaction. To determine which financial account of the plurality of financial accounts to select, the one or more categories of each financial account of the plurality of financial accounts can be compared with the one or more categories of the transaction to identify matching categories. For example, if a particular financial account of the plurality of financial accounts includes both 'Travel' and 'Foreign Spending' categories and the transaction information also includes both 'Travel' and 'Foreign Spending', two matching categories are identified, and the particular financial account is selected.

In the case where there is not an exact match between categories of financial accounts, a financial account of the plurality of financial accounts that has the most matching categories with the one or more categories of the transaction information is selected. In the case where two or more financial accounts have the same number of matching categories with the one or more categories of the transaction information, a financial account of two or more financial accounts that has a best ranking for the matching categories. In some embodiments, financial accounts can be ranked for different categories. Rankings of financial accounts can be retrieved from a third-party source or can be added manually by an administrator or consumer. For example, a first financial account may be ranked #2 for 'Travel' and #5 for 'Dining' while a second financial account may be ranked #1 for 'Travel' and #6 for 'Dining'. The ranking of categories of financial accounts can be used to select a financial account.

In some embodiments, a financial account associated with one or more gift cards may be selected to use in a given financial transaction if the financial transaction is determined to be from an entity that accepts such gift cards. For gift cards that may be used at a variety of entities (i.e. stores), this technique is particularly useful. For example, if a consumer has a gift card for a particular restaurant group which may be used at a variety of restaurant brands in the group, the card may be connected to the payment intermediary computer system 118. Based on card metadata, the gift card may be matched with a list of brands and individual stores for which the card may be used. When a financial transaction is initiated, the gift card will be selected if it can be used at that store. In some cases, a consumer may not even know that the card is redeemable at that restaurant, particularly when the card is branded as or was purchased from another store that was branded with a different restaurant brand in the restaurant group.

Financial Metrics for Selecting which Account to Use in a Given Transaction

Payment intermediary computer system 118 can calculate several different metrics based on financial account information. One health metric represents an income-to-spend ratio. A second health metric represents a trajectory of the income-to-spend ratio, which identifies whether the income-to-spend ratio is consistently headed in a positive or negative direction. A third health metric measures the variability of the trajectory of the income-to-spend ratio and the income-to-spend ratio against an overall balance of financial accounts. For example, a consumer with a negative trajectory of the income-to-spend ratio representing a $1000 per month decrease in account balance might have a third health metric in an acceptable range if the total financial account balance is $400,000, while a consumer with a total financial account balance of $2000 will have a significantly different third health metric, representing a severe (individualized) financial health trajectory. Another payment-related set of metrics measures the impact of the first three on the ability to pay outstanding credit-related bills, and makes a determination regarding whether the bills can be paid off entirely with little impact on the first three metrics.

The above discussed metrics can be used to determine what financial account to select. For example, if the trajectory of the income-to-spend ratio indicates a negative trajectory and paying off a financial account would cause an impact on the third health metric, then a lower interest card would be preferable, and may be selected to use in a given transaction. In addition, an alert might be sent to the customer via a mobile application to indicate the impact of the purchase on their financial health.

However, if the payment intermediary computer system 118 determines that payment-related metrics show that paying off a financial account balance will have little impact on the third financial health metric, then the decision about which financial account to charge will be based on the benefits or rewards associated with the financial accounts. For example, if the metrics indicate that the third financial health metric would reach an undesirable threshold if the financial transaction in question were to be paid off in full, then the payment intermediary computer system 118 determines that the charge should be attributed to the financial account with the lowest interest rate.

The above discussed metrics and additional metrics can be generated by financial account information capture a complete view of financial health, and to look for gaps. For example, by reviewing checking financial account transactions and matching them against credit card financial account transactions, the system can tell which financial account is typically used for such transactions and track the balance of a particular account. By reviewing transactions for each credit card, the payment intermediary computer system 118 can generate a metric that shows the likelihood that a particular card is paid off in full or track the typical payment. For example, if a payment is always or nearly always (determined against a threshold) for the full amount, then there is a reasonable confidence that the card will be paid in full in the next cycle. However, that confidence can be weakened if the balance is predicted to be greater than in previous months based on current and projected spending on that card. In this way, each card may have a different paid-in-full confidence metric, and the payment intermediary computer system 118 may choose to pay with the card that is likely to be paid in full, if doing so is unlikely to impact the third financial health metric discussed above. These situations may arise, for example, when a consumer has one credit card set up for auto-pay in full, while another is set up to automatically pay the minimum balance. By detecting this, the payment intermediary computer system 118 can make a suggestion to the consumer that they increase the amount to be automatically paid on the latter credit card account.

These metrics can be calculated on a regular basis to be presented to a consumer or can be used to present other information or suggestions to the consumer. For example, showing a consumer that their spend trajectory is 50% of their income (i.e. the second health metric) can indicate that the consumer may benefit from considering investment options or moving money into an interest-bearing account. Using the financial account information, the payment intermediary computer system 118 can identify which accounts are interest bearing. The payment intermediary computer system 118 can then make suggestions. Using the third health metric, the payment intermediary computer system 118 can show consumers the deviation in their spending habits, even if their general financial health is good. These metrics can even be used to set alerts, with preferences for each user. Showing users metrics associated with each financial account can help users identify spending and payment habits on a per-account basis, which may be useful to help consumers avoid underpaying or to identify cards for which too many auto-bill-pay connections have been attached.

Machine Learning for Selection

In some embodiments, supervised learning may be used in order to generate a machine learning model. Not depicted in FIG. 1, creating a supervised machine learning model may include receiving transaction information, financial account information, and an indication of a selection of a financial account based on the transaction information and financial account information. The supervised machine learning model can then be trained using the transaction information, financial account information, and an indication of a selection of a financial account based on the transaction information and financial account information as the training data. The supervised machine learning model can then be used to select a financial account of the plurality of financial accounts for use in a given financial transaction. If the supervised machine learning model indicates that a particular financial account of the plurality of financial accounts should be used for a transaction, the particular financial account can be selected for use in a given financial transaction. Examples of supervised machine learning algorithms that could be used include, but are not limited to, Support Vector Machines, linear regression, logistic regression, neural networks, and nearest neighbor methods.

For example, historical transaction records may be stored that include historical records of previous transactions and corresponding financial account selections. Each record may include: transaction information for a particular transaction, financial account information for the plurality of financial accounts at a time that the particular financial transaction was received, and an indication of which financial account was selected for the particular transaction. To train the supervised machine learning model, the transaction information for the particular transaction and the financial account information for the plurality of financial accounts at a time that the particular financial transaction was received may be used an input while the indication of which financial account was selected for the particular transaction may be used as output. As discussed above, the supervised machine learning can be used in isolation to select a financial account of the plurality of financial accounts for use in a given financial transaction or can be used in combination with other selection techniques discussed herein to select a financial account of the plurality of financial accounts for use in a given financial transaction.

In some embodiments, an unsupervised machine learning model may be used to detect transaction anomalies. For example, the unsupervised machine learning model may take in one or more financial transactions associated with each financial account of the plurality of financial accounts and detect when a new financial transaction is unlike previous financial transactions from the plurality of financial accounts. Such a satisfied condition for the unsupervised machine learning model may result in an alert being triggered and transmitted to a consumer associated with computing device 120. In some cases, detection of a transaction anomaly will result in a selection of a particular financial account that is identified as being designated for anomaly transactions. Examples of unsupervised machine learning algorithms that may be used include k-means clustering, mixture models, hierarchical clustering, Neural Networks, autoencoders, Deep Belief Nets, Hebbian Learning, Generative Adversarial Networks, and self-organizing maps.

For example, if a consumer purchases a motorcycle for $30,000 and the same consumer has only made purchases in the past for $1,000 or less, the unsupervised machine model may detect an anomaly transaction.

In some embodiments, transaction anomalies can be detected by determining that an amount of a received financial transaction is outside a threshold value of one or more amounts associated with financial transactions from the plurality of financial accounts. For example, if a calculated mean (i.e. average) amount for financial transactions of the plurality of financial accounts is $100 and a threshold value is set to $300, any financial transaction with an amount greater than $400 is detected as a transaction anomaly.

In some embodiments, once a transaction anomaly is detected for a financial transaction, it may be determined that, based on financial account information associated with the plurality of financial accounts, that an amount associated with the financial transaction is unlikely to be paid off within a specific timeframe. In response to such a determination, a financial account of the plurality of financial accounts with the lowest interest rate may be selected. Similarly, it may be determined that, based on financial account information associated with the plurality of financial accounts, that an amount associated with the financial transaction is likely to be paid off within a specific timeframe. In response to such a determination, a financial account of the plurality of financial accounts that awards the most points for a category associated with the financial transaction may be selected.

In some embodiments, output of a trained machine learning model may be combined with other financial account selection techniques discussed herein to select a financial account for use in a given financial transaction. For example, an output of a trained supervised machine learning model that selects a particular financial account may be weighted and combined with an output of another financial account selection technique to select a financial account for use in a given financial transaction.

As a specific example, suppose a trained supervised machined learning model produces a first output that specifies that a first financial account should be selected for use in a given financial transaction. Also suppose that by comparing categories of financial account information and transaction information, as discussed herein, a second output is generated that indicates that a second financial account should be selected for use in a given financial transaction. Because the first and second outputs differ, the ultimate selection of a financial account will depend on how much weight is given to the first output of the supervised machine learning model. Such weightings can be configured by a consumer and may be static or dynamic. The weights may be static in a sense that when a weight for an output of a machine learning model is selected, the weight will not change unless modified by a consumer. The weights may be dynamic in a sense that the weight for an output of a particular machine learning model may increase over time as more feedback information is used to continuously train the particular machine learning model. Thus, in the case of dynamic weighting, as the particular machine learning model becomes more accurate over time due to receiving more and more feedback information, the output of the particular machine learning model is given more weight and thus has a greater influence on selecting a financial account, in combination with other financial account selection techniques, for use in a given financial transaction.

Consumer Preference Information

In some embodiments, the selection of a financial account can be made by the TDFAS system based on consumer preference information, in addition to the transaction information and financial account information. Consumer preference information can be provided by a consumer associated with the financial account by the payment intermediary computer system 118 prompting the consumer to select preferences via computing device, such as a mobile computing device. Consumer preference information may specify selections of financial accounts that should be used for certain categories of transactions. For example, consumer preference information may include a preference that indicates that a particular financial account should be used for all travel related purchases. As another example, consumer preference information may include a preference that indicates that a particular financial account should be used for all dining purchases. As another example, consumer preference information may include a preference that indicates that a particular financial account should be used for all transaction anomalies. As another example, consumer preference information may indicate that a priority for the consumer is to accumulate cash back points.

Consumer preference information may also specify selections of financial account information of one or more financial accounts that should be or should not be included when selecting a financial account. For example, consumer preference information may specify that liability information should not be included as a basis for selecting a financial account. As another example, consumer preference information may specify that income information should not be included as a basis for selecting a financial account.

Additionally, in some embodiments, consumers can set goals, and prioritize those goals in consumer preference information. For example, if a consumer has a goal to maximize cash availability in a financial account, then gift card use will be prioritized, with lower interest rate cards after that. If a consumer has a certain amount of points they are attempting to acquire for travel use, then points may take priority until that threshold is reached.

In other embodiments, consumers may set up different consumer preference profiles based on the context of their spending. For example, a consumer may use a mobile app to "turn on" a business reimbursement spending profile, which includes preferences indicating that all spending should be charged to a particular financial account to maximize points. Reminders or notifications can be used to remind the consumer to pay that financial account in full once the reimbursement is detected to have arrived in the consumer's financial account. Reimbursement detection can be executed by recording the amount spent during that use of a particular consumer preference profile, and searching for a non-typical (not normal payroll) deposit in the consumer's corresponding financial account.

Consent Alerts

In some embodiments, once a financial account is selected should be selected for use in a financial transaction but before the financial transaction is charged to a financial account, payment intermediary computer system 118 may generate and cause the display of an interface that prompts a consumer to consent to the selection a financial account of the plurality of financial accounts for use in the financial transaction at a computing device associated with the consumer. For example, a prompt may be delivered to the consumer that states "Your Chase Reserve financial account has been selected for this transaction. Would you like to use your Chase Reserve financial account for this transaction?" In the case that the consumer consents, the selected financial account is used in step 208. In the case the consumer does not consent, the consumer can select another financial account of the plurality of financial accounts to proceed with. In some situations, a financial transaction may time out before a user consents to or selects a financial account. In this scenario, no financial transaction is charged to a financial account.

In step 208, the financial transaction is charged to the first financial account. Charging the financial transaction to the first financial account may comprise causing the financial transaction to be charged to the first financial account. In context of FIG. 1, causing the financial transaction to be charged to the first financial account includes payment intermediary computer system 118 sending the financial transaction and financial account information associated with the first financial account to processing computing device 112. Processing computing device 112 sends the financial transaction and financial account information associated with the first financial account to financial computing device 114. Financial computing device 114 determines that the received financial account is managed by banking computing device 116 and sends the transaction and financial account information to banking computing device 116. Banking computing device 116 determines the result of a payment authorization process and sends the results of the authorization process to POS System 104 to complete the financial transaction.

In step 210, a digital receipt indicating that the financial transaction was charged to the first financial account is generated based on the financial transaction being charged to the first financial account. For example, payment intermediary computer system 118 generates the digital receipt based on the financial transaction being charged to the first financial account. The digital receipt may then be transmitted to computing device 120 that is associated with a consumer that initiated the financial transaction.

Explanatory Data

In some embodiments, the digital receipt includes explanatory information that provides an explanation of why the first financial account of the plurality of financial account was selected for use in a given financial transaction. The payment intermediary computer system 118 generates explanation information about why the financial account selection was made. For example, the explanatory information may indicate that a particular financial account was selected for use in a given financial transaction because the transaction is related to travel and the particular financial account offers the most reward points for travel out of the plurality of financial accounts. As another example, the explanatory information may indicate that a particular financial account was selected for use in a given financial transaction because the transaction was identified as a transaction anomaly and the particular financial account offers lowest monthly interest rate out of the plurality of financial accounts.

Feedback

In some embodiments, the digital receipt includes an interface that allows a consumer to provide feedback information regarding the selection of the first financial account for use in the financial transaction. For example, a consumer may provide feedback that the selection of the first financial account for use in the financial transaction was preferred. As another example, a consumer may provide feedback that the selection of the first financial account for use in the financial transaction was not preferred, and that a selection of a different financial account of the plurality of financial accounts for use in the financial transaction would have been preferred.

The feedback information associated with each transaction can be used to train a supervised machine learning model in additional stages as it is received. As the supervised machine learning model receives more feedback information to train on, the accuracy of the output selections of financial accounts from the supervised machine learning model can be improved incrementally with each transaction over time.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer Systems, portable computer Systems, handheld devices, networking devices or any other device that incorporates hard-wired and/or program logic to implement the techniques.

Figure 3:
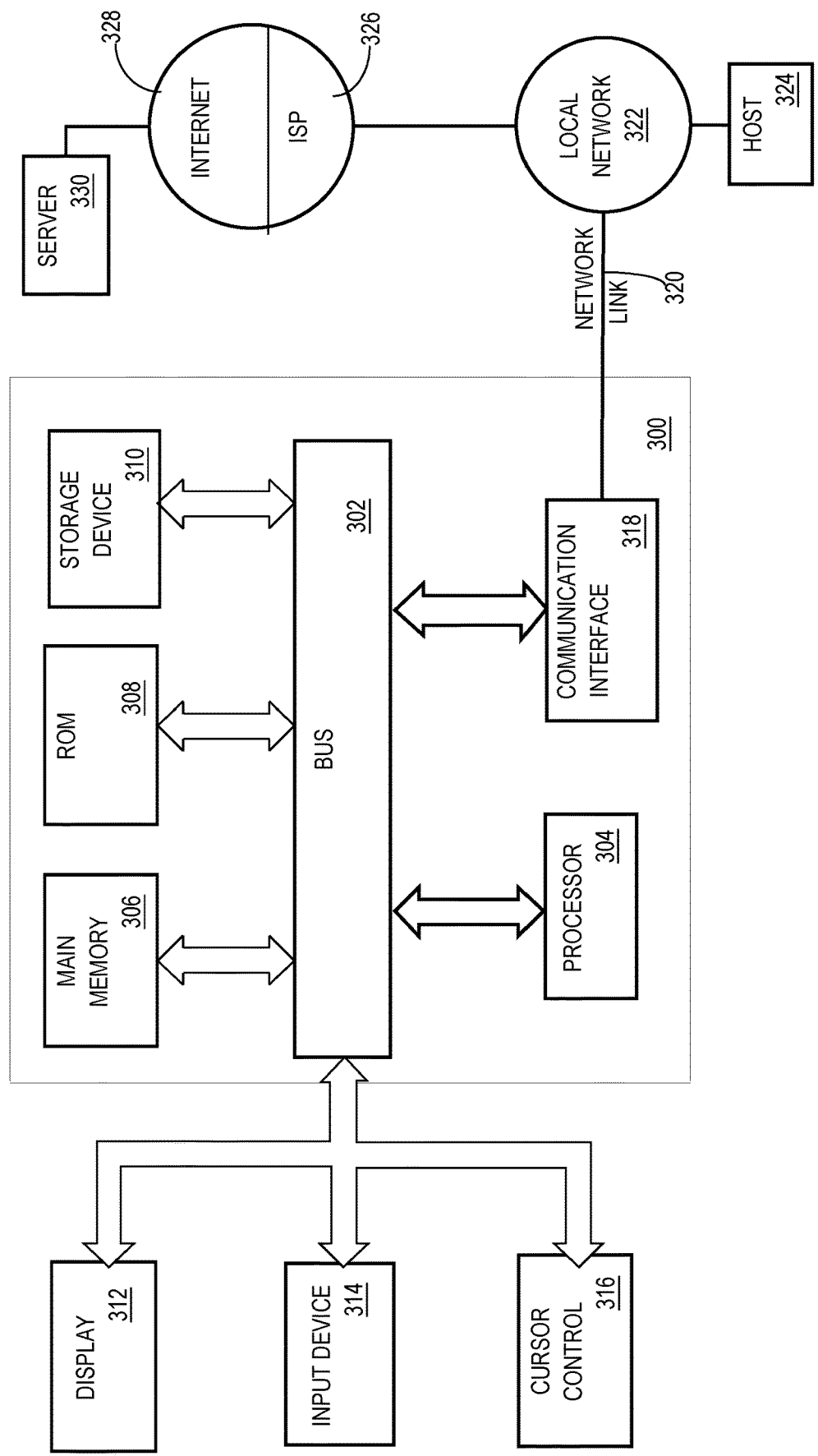
FIG. 3 is a block diagram of a computer system that may be used to implement the techniques described herein.

For example, FIG. 3 is a block diagram that illustrates a computer System 300 upon which an embodiment of the invention may be implemented. Computer System 300 includes a bus 302 or other communication mechanism for communicating information, and a hardware processor 304 coupled with bus 302 for processing information. Hardware processor 304 may be, for example, a general purpose microprocessor.

Computer System 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer System 300 into a special-purpose machine that is customized to perform the operations specified in the instructions.

Computer System 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer System 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer System 300 may implement the techniques described herein using customized hard-wired logic, one or more ASICs or FPGAs, firmware and/or program logic which in combination with the computer System causes or programs computer System 300 to be a special-purpose machine. According to one embodiment, the techniques herein are performed by computer System 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer System 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer System 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer System 300, are example forms of transmission media.

Computer System 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method for selecting a financial account for a financial transaction, comprising:
receiving transaction information of the financial transaction, the financial transaction involving a multi-account payment card associated with a multi-account payment card identification (ID);
determining that the multi-account payment card ID is associated with a plurality of financial accounts;
wherein each of the plurality of financial accounts is associated with a distinct payment source;
in response to determining that the multi-account payment card ID is associated with the plurality of financial accounts, selecting a particular financial account of the plurality of financial accounts based, at least in part, on:
training a supervised machine learning model in a first stage using, as a first training set, a plurality of historical transaction records that each include transaction information for a particular financial transaction, financial account information for the plurality of financial accounts at a time that the particular financial transaction was received, and an indication of which financial account of the plurality of financial accounts was selected for the particular financial transaction; and
using the supervised machine learning model to generate an output that selects a first financial account of the plurality of financial accounts based on:
financial account information associated with the plurality of financial accounts at a time that the financial transaction was received, and
the transaction information of the financial transaction;
using one or more account selection techniques that do not involve any machine learning model to generate one or more outputs that select one or more additional financial accounts of the plurality of financial accounts;
assigning a weight to the output of the supervised machine learning model;
assigning a distinct weight to each of the one or more outputs of the one or more account selection techniques;
selecting the particular financial account based on:
the output of the supervised machine learning model;
the weight assigned to the output of the supervised machine learning model;
the one or more outputs of the one or more account selection techniques; and
the distinct weight assigned to each of the one or more outputs of the one or more account selection techniques;
causing the financial transaction to be charged to the particular financial account;
receiving feedback information regarding the selection of the particular financial account;
training the supervised machine learning model in a second stage using, as a second training set, at least the feedback information regarding the selection of the particular financial account.

2. The method of claim 1, wherein using the one or more account selection techniques includes generating an output that selects a given financial account of the plurality of financial accounts by:
determining one or more categories for the financial transaction based on the financial transaction information;
determining one or more categories for each financial account of the plurality of financial accounts based on the financial account information associated with each financial account;
identifying that the given financial account of the plurality of financial accounts includes one or more categories that match the one or more categories for the financial transaction, and
in response to identifying that the given financial account of the plurality of financial accounts includes one or more categories that match the one or more categories for the financial transaction, selecting the given financial account of the plurality of financial accounts.

3. The method of claim 2, wherein the one or more categories for each financial account of the plurality of financial accounts are determined based on reward information for each financial account of the plurality of financial accounts.

4. The method of claim 1, further comprising:
before causing the financial transaction to be charged to the particular financial account, generating and displaying, at a computing device associated with a consumer that initiated the financial transaction, an interface that allows the consumer to provide consent to charge the financial transaction to the particular financial account.

5. The method of claim 1, further comprising:
generating, based on the financial transaction being charged to the particular financial account, a digital receipt indicating that the financial transaction was charged to the particular financial account; and
transmitting the digital receipt to a computing device associated with a consumer that initiated the financial transaction.

6. The method of claim 5, wherein the digital receipt includes explanatory information that provides an explanation of why the particular financial account of the plurality of financial accounts was selected.

7. The method of claim 5, wherein the digital receipt includes an interface that allows a consumer to provide feedback information regarding the selection of the particular financial account.

8. The method of claim 1, wherein using the one or more account selection techniques includes generating an output that selects a given financial account of the plurality of financial accounts by:
selecting the given financial account of the plurality of financial accounts based on consumer preference information that specifies selections of financial accounts of the plurality of financial accounts that should be selected for certain categories of financial transactions.

9. The method of claim 1, wherein for each of the plurality of financial accounts, the distinct payment source is one of:
a credit card,
a debit card,
an automatic teller machine (ATM) card,
a gift card, or
a credit line.

10. The method of claim 9, further comprising:
determining, based at least on the transaction information of the financial transaction, that a merchant associated with the financial transaction accepts gift cards that are associated with a given financial account of the plurality of financial accounts;
wherein using the one or more account selection techniques includes generating an output that selects the given financial account of the plurality of financial accounts by:

selecting the given financial account of the plurality of financial accounts based, at least in part on determining that the merchant associated with the financial transaction accepts gift cards that are associated with the given financial account.

11. The method of claim 1, further comprising:
calculating a first metric based on the financial account information associated with the plurality of financial accounts, the first metric indicating an income-to-spend ratio;
calculating a second metric based on the financial account information associated with the plurality of financial accounts, the second metric indicating a trajectory of the income-to-spend ratio, which identifies whether the income-to-spend ratio is consistently headed in a positive or negative direction.

12. The method of claim 11, further comprising:
determining that the trajectory of the income-to-spend ratio indicates a negative trajectory;
wherein using the one or more account selection techniques includes generating an output that selects a given financial account of the plurality of financial accounts by: in response to determining that the trajectory of the income-to-spend ratio indicates a negative trajectory, selecting the given financial account of the plurality of financial accounts based, at least in part on determining that the given financial account is associated with a lower interest rate that the other financial accounts of the plurality of financial accounts.

13. The method of claim 11, further comprising:
calculating a third metric based on the financial account information associated with the plurality of financial accounts, the third metric indicating a variance of the trajectory of the income-to-spend ratio and the income-to-spend ratio against an overall balance of the plurality financial accounts;
determining that the third metric would exceed a threshold if the financial transaction was paid off in full;
wherein using the one or more account selection techniques includes generating an output that selects a given financial account of the plurality of financial accounts by:
in response to determining that the third metric would exceed a threshold if the financial transaction was paid off in full, selecting the given financial account of the plurality of financial accounts based, at least in part on determining that the given financial account is associated with a lower interest rate that the other financial accounts of the plurality of financial accounts.

14. One or more non-transitory computer-readable media storing instructions which, when executed by one or more processors, cause:
receiving transaction information of a financial transaction, the financial transaction involving a multi-account payment card associated with a multi-account payment card identification (ID);
determining that the multi-account payment card ID is associated with a plurality of financial accounts;
wherein each of the plurality of financial accounts is associated with a distinct payment source;
in response to determining that the multi-account payment card ID is associated with the plurality of financial accounts, selecting a particular financial account of the plurality of financial accounts based, at least in part, on:
training a supervised machine learning model in a first stage using, as a first training set, a plurality of historical transaction records that each include transaction information for a particular financial transaction, financial account information for the plurality of financial accounts at a time that the particular financial transaction was received, and an indication of which financial account of the plurality of financial accounts was selected for the particular financial transaction; and
using the supervised machine learning model to generate an output that selects a first financial account of the plurality of financial accounts based on:
financial account information associated with the plurality of financial accounts at a time that the financial transaction was received, and
the transaction information of the financial transaction;
using one or more account selection techniques that do not involve any machine learning model to generate one or more outputs that select one or more additional financial accounts of the plurality of financial accounts;
assigning a weight to the output of the supervised machine learning model;
assigning a distinct weight to each of the one or more outputs of the one or more account selection techniques;
selecting the particular financial account based on:
the output of the supervised machine learning model;
the weight assigned to the output of the supervised machine learning model;
the one or more outputs of the one or more account selection techniques; and
the distinct weight assigned to each of the one or more outputs of the one or more account selection techniques;
causing the financial transaction to be charged to the particular financial account;
receiving feedback information regarding the selection of the particular financial account;
training the supervised machine learning model in a second stage using, as a second training set, at least the feedback information regarding the selection of the particular financial account.

15. The one or more non-transitory computer-readable media of claim 14, wherein using the one or more account selection techniques includes generating an output that selects a given financial account of the plurality of financial accounts by:
determining one or more categories for the financial transaction based on the financial transaction information;
determining one or more categories for each financial account of the plurality of financial accounts based on the financial account information associated with each financial account;
identifying that the given financial account of the plurality of financial accounts includes one or more categories that match the one or more categories for the financial transaction, and
in response to identifying that the given financial account of the plurality of financial accounts includes one or more categories that match the one or more categories for the financial transaction, selecting the given financial account of the plurality of financial accounts.

16. The one or more non-transitory computer-readable media of claim 15, wherein the one or more categories for each financial account of the plurality of financial accounts are determined based on reward information for each financial account of the plurality of financial accounts.

17. The one or more non-transitory computer-readable media of claim 14, further comprising instructions for:
before causing the financial transaction to be charged to the particular financial account, generating and displaying, at a computing device associated with a consumer that initiated the financial transaction, an interface that allows the consumer to provide consent to charge the financial transaction to the particular financial account.

18. The one or more non-transitory computer-readable media of claim 14, further comprising instructions for:
generating, based on the financial transaction being charged to the particular financial account, a digital receipt indicating that the financial transaction was charged to the particular financial account; and
transmitting the digital receipt to a computing device associated with a consumer that initiated the financial transaction.

19. The one or more non-transitory computer-readable media of claim 18, wherein the digital receipt includes explanatory information that provides an explanation of why the particular financial account of the plurality of financial accounts was selected.

20. The one or more non-transitory computer-readable media of claim 18, wherein the digital receipt includes an interface that allows a consumer to provide feedback information regarding the selection of the particular financial account.

21. The one or more non-transitory computer-readable media of claim 14, wherein using the one or more account selection techniques includes generating an output that selects a given financial account of the plurality of financial accounts by:
selecting the given financial account of the plurality of financial accounts based on consumer preference information that specifies selections of financial accounts of the plurality of financial accounts that should be selected for certain categories of financial transactions.

22. The one or more non-transitory computer-readable media of claim 14, wherein for each of the plurality of financial accounts, the distinct payment source is one of:
a credit card,
a debit card,
an automatic teller machine (ATM) card,
a gift card, or
a credit line.

23. The one or more non-transitory computer-readable media of claim 22, further comprising instructions for:
determining, based at least on the transaction information of the financial transaction, that a merchant associated with the financial transaction accepts gift cards that are associated with a given financial account of the plurality of financial accounts;
wherein using the one or more account selection techniques includes generating an output that selects the given financial account of the plurality of financial accounts by:
selecting the given financial account of the plurality of financial accounts based, at least in part on determining that the merchant associated with the financial transaction accepts gift cards that are associated with the given financial account.

24. The one or more non-transitory computer-readable media of claim 14, further comprising instructions for:
calculating a first metric based on the financial account information associated with the plurality of financial accounts, the first metric indicating an income-to-spend ratio;
calculating a second metric based on the financial account information associated with the plurality of financial accounts, the second metric indicating a trajectory of the income-to-spend ratio, which identifies whether the income-to-spend ratio is consistently headed in a positive or negative direction.

25. The one or more non-transitory computer-readable media of claim 24, further comprising instructions for:
determining that the trajectory of the income-to-spend ratio indicates a negative trajectory;
wherein using the one or more account selection techniques includes generating an output that selects a given financial account of the plurality of financial accounts by: in response to determining that the trajectory of the income-to-spend ratio indicates a negative trajectory, selecting the given financial account of the plurality of financial accounts based, at least in part on determining that the given financial account is associated with a lower interest rate that the other financial accounts of the plurality of financial accounts.

26. The one or more non-transitory computer-readable media of claim 24, further comprising instructions for:
calculating a third metric based on the financial account information associated with the plurality of financial accounts, the third metric indicating a variance of the trajectory of the income-to-spend ratio and the income-to-spend ratio against an overall balance of the plurality financial accounts;
determining that the third metric would exceed a threshold if the financial transaction was paid off in full;
wherein using the one or more account selection techniques includes generating an output that selects a given financial account of the plurality of financial accounts by:
in response to determining that the third metric would exceed a threshold if the financial transaction was paid off in full, selecting the given financial account of the plurality of financial accounts based, at least in part on determining that the given financial account is associated with a lower interest rate that the other financial accounts of the plurality of financial accounts.

* * * * *